United States Patent Office 3,023,198
Patented Feb. 27, 1962

3,023,198
POLYMERIZATION OF VINYL ETHERS
Gene Nowlin, Princeton, N.J., and Harold D. Lyons, Bartlesville, Okla., assignors to Phillips Petroleum Company, a corporation of Delaware
No Drawing. Filed June 3, 1957, Ser. No. 662,990
12 Claims. (Cl. 260—88.1)

This invention relates to a new process for the polymerization of vinyl ethers. In a further aspect, this invention relates to new polymers, including copolymers, of vinyl ethers.

It is known that vinyl ethers can be polymerized alone to form homopolymers or with other vinyl ethers, monoolefins or multiolefins, including conjugated diolefins to form copolymers in the presence of catalysts such as stannic chloride, aluminum chloride, gallium trichloride, boron fluoride, and the like. Polymerization temperatures are generally kept low, frequently below 10° C., when catalysts of this type are employed, particularly if it is desired to prepare solid products.

It has now been found that vinyl ethers can be readily and conveniently polymerized alone or in admixture with other vinyl ethers, or copolymerized with monoolefinic or multiolefinic compounds, conjugated or unconjugated, generally containing from 2 to 15 carbon atoms per molecule, at temperatures from as low as $-100°$ C. to temperatures as high as $200°$ C. using a catalyst system comprising at least one member selected from the group consisting of (1) at least one compound selected from the group consisting of organometal compounds and metal hydrides; (2) a mixture of (a) at least one compound selected from the group consisting of organometal compounds and metal hydrides, and (b) a compound of a metal selected from the group consisting of group IVA, group VA, and group VIA metal oxides, hydrides, halides, oxyhalides, and salts of organic acids, and group IV alcoholates; and (3) a mixture of (a) at least one compound selected from the group consisting of group IVA metal halides and (b) at least one metal selected from the group consisting of metals of group I, (the alkali metals), group IIB (magnesium, zinc, cadmium, and mercury), and group IIIB (aluminum, gallium, indium, and thallium), wherein the metals are grouped according to Mendeleeff's periodic table.

When using the catalysts of this invention, products ranging from sticky materials and soft gums to solid polymers including elastomers and waxes can be readily prepared. While low temperatures can be used, a particular advantage of this invention is that all operations can be effected within a convenient temperature range with no specific cooling system being required such as heretofore been employed when using catalyst of the Friedel-Crafts type. Catalysts which are preferred are titanium tetrachloride used in conjunction with triisobutylaluminum or a mixture of ethylaluminum dichloride with diethylaluminum chloride, frequently referred to as aluminum sesquichloride.

Depending upon the type of product, these polymers have a wide range of uses. It has been shown that they are quite effective in water-proofing cloth. Additional uses include solvent and water-dispersed waxes; waterproofing agents for textiles; pour point depressants for lubricating oils; plasticizers for nitrocellulose, chlorinated rubber, polyvinyl chloride, chlorinated polyethylene, chlorinated polybutadiene, polyvinyl acetate; drilling mud additives; hydraulic fluids; solvent and water-dispersed adhesives; pressure-sensitive adhesives for surgical and transparent tapes; rubber tackifiers; leather impregnating agents; leather dressing compounds; protective coatings; and textile finishing agents.

The following are objects of our invention.

An object of our invention is to provide a new method of polymerizing vinyl ethers. A further object of our invention is to provide new polymers of vinyl ethers. A further object of our invention is to provide a vinyl ether polymerization process which can be carried out at room temperature. A further object of our invention is to provide novel materials for application to fabric to improve the water repellency thereof.

Other objects and advantages of this invention will become apparent to those skilled in the art upon reading the accompanying disclosure.

As stated, our novel method comprises polymerizing these vinyl ethers in the presence of a catalyst comprising at least one member selected from the group consisting of (1) at least one compound selected from the group consisting of organometal compounds and metal hydrides; (2) a mixture of (a) at least one compound selected from the group consisting of organometal compounds and metal hydrides, and (b) a compound of a metal selected from the group consisting of group IVA, group VA, and group VIA metal oxides, hydrides, halides, oxyhalides, and salts of organic acids, and group IV alcoholates; and (3) a mixture of (a) at least one compound selected from the group consisting of group IVA metal halides and (b) at least one metal selected from the group consisting of metals of group IA, group IIB, and group IIIB, wherein the metals are grouped according to Mendeleeff's periodic table.

The first component is the organometal compound (including those where one or more but not all of the organo groups are replaced by halogen) or a metal hydride. The organometal compounds referred to include without limitation, alkyl, cycloalkyl, or aryl compounds of di-, tri-, or tetravalent metals, particularly aluminum, zinc, barium, lead, and tin or such organometal compounds where one or more of the alkyl, cycloalkyl, or aryl groups is replaced by a halogen atom and/or a hydrogen atom. The alkyl groups can be quite large, compounds being applicable with 15 or more carbon atoms in each alkyl, cyclo-alkyl, or aryl group and 40 or more carbon atoms in the molecule. Specific examples of such compounds are triethylaluminum, a mixture of diethylaluminum chloride and ethylaluminum dichloride, sometimes referred to herein as ethyl-aluminum sesquichloride, diethylaluminum hydride, ethylaluminum dichloride, or diethylaluminum chloride, taken alone, trioctyaluminum, tridodecylaluminum, triphenylaluminum, triphenylindium, triphenylgallium, diphenylberyllium, dicyclohexylberyllium, cyclohexylzinc chloride, tetraphenyllead, tetraethyltin and $CH_3AlCl_2$, $(C_4H_9)_2AlBr$, $C_8H_{17}AlI_2$, $(C_3H_7)_2GaF$, $(C_6H_{11})_2GaCl$ (cyclohexane derivative), $(C_6H_5)GaBr_2$, $C_{20}H_{41}GaBr_2$, $(C_{14}H_{29})_2GaF$, $(C_6H_5)_2InCl$, $C_8H_{17}InF_2$, $(C_6H_{11})InBr_2$ (cyclohexane derivative), $C_{17}H_{35}BeI$, $CH_3BeBr$, and the like.

The metal hydrides can include, as specific examples, alumnum hydride, lithium aluminum hydride, barium hydride, gallium hydride, indium hydride, sodium aluminum hydride, potassium beryllium hydride, and boron hydride.

The compounds of a metal of groups IV to VI of the periodic system include the oxides, halides, hydrides, oxyhalides, and the salts of organic acids, usually having 20 or less carbon atoms, such as formic acid, of the group IV to group VI metals such as titanium, zirconium, chromium, thorium, molybdenum, vanadium, and alcoholates of the group IV metals.

The alcoholates of a metal of group IV of the periodic system which can be employed conform to the formula $X_nM(OR)_m$, where $m+n$ equals the valence of the metal M, X is a halogen, and R is an organic radical usually having 20 or less carbon atoms, and preferably being an alkyl, cycloalkyl, aryl, alkaryl, or aralkyl group. Specific examples of such alcoholates are titanium butoxide (tetra-n-butyl titanate), tetra-sec-butyl titanate, tetraisopropyl titanate, tetra-2-ethylbutyl titanate, tetra-2-ethylhexyl titanate, tetrastearyl titanate, tetraethyl titanate, tetra(chloroethyl) titanate, tetra-m-tolyl titanate, tetraallyl titanate, tetracyclohexyl titanate, tetracyclopentyl titanate, tetrabenzyl titanate, tetraethyl zirconate, tetramethyl zirconate, tetraisopropyl zirconate, tetraamyl zirconate, dichloro diethyl titanate ($Cl_2Ti(OC_2H_5)_2$), monochloro triethyl titanate ($ClTi(OC_2H_5)_3$), and dichloro diethyl zirconate ($Cl_2Zr(OC_2H_5)_2$). Also included are such compounds as $$Hf(OCH_3)_4$$
$$Th(OC_6H_5)_4$$
$$Th(OC_3H_7)_4$$
$$Cl_3Ti(OC_6H_4CH_3)$$
$$Zr(OC_4H_9)_4$$
$$Cl_2Hf(OC_{10}H_{21})_2$$
$$Th(OC_6H_{13})_4$$

and $$Zr(OC_{12}H_{25})_4$$

A subgroup of this second group of metal compounds are the group IV metal halides such as chlorides, bromides, and iodides of titanium, zirconium, and hafnium.

The third group of the above-mentioned catalyst system comprises metals of groups I, II, and III. The most important members of these are sodium, magnesium, and aluminum.

Examples of suitable catalyst systems in accordance with the foregoing disclosure are as follows:

(a) Trialkylaluminums such as triethylaluminum or triisobutylaluminum;

(b) Trialkylaluminums, e.g., triethylaluminum or triisobutylaluminum and the tetravalent metal halides of the type represented by titanium tetrachloride;

(c) A group IV inorganic halide (such as titanium tetrachloride) and a low valence metal selected from the group comprising alkali metals, for example, magnesium and titanium tetrachloride with the addition of metallic aluminum;

(d) A group IV halide, for example, titanium tetrachloride, and a low valence metal identified in (c), for example, sodium or magnesium;

(e) A mixture of titanium hydride and an organometal compound exemplified by alkylaluminum halide, i.e., a mixture of titanium hydride and ethylaluminum sesquichloride;

(f) Titanium dioxide and an organometal compound such as trialkylaluminum and alkylaluminum chlorides, e.g., a mixture of titanium dioxide and ethylaluminum sesquichloride;

(g) A mixture of molybdenum pentachloride and organometal compounds and halides exemplified by triethylaluminum and ethylaluminum dichloride;

(h) A mixture of a derivative selected from the oxides of molybdenum, alkali metal and ammonium molybdates, and an organometal compound or halide exemplified by triisobutylaluminum and isobutylaluminum dichloride;

(i) At least one derivative selected from the group consisting of oxides, halides, and oxyhalides of vanadium and complex salts of said halides with a member selected from the group consisting of ammonium halide and an alkali metal halide, and an organometal compound exemplified by triethylaluminum, for example, vanadium oxide, and triethylaluminum;

(j) A chromyl halide and a metal hydride or an organometal compound, for example, chromyl chloride and triethylaluminum;

(k) At least one halide of titanium, zirconium or hafnium and at least one hydride of lithium, sodium, potassium, rubidium, cesium, magnesium, calcium, strontium, barium, lanthanum or thorium, for example, zirconium tetrachloride and calcium hydride;

(l) A hydrocarbon derivative of one of the metals, zinc, cadmium, mercury, and magnesium, and a member selected from the group consisting of halides of titanium, zirconium, vanadium, and molybdenum, oxyhalides of titanium, zirconium, vanadium, molybdenum, and chromium, and complex salts of said halides, and oxyhalides with a member selected from the group consisting of halides of the alkali metals and ammonia, for example, diethylzinc and titanium tetrachloride.

Rations or organometal compounds to metal halide of 40:1 to 2:1 on a mol basis are used and a catalyst level of 0.1 to 50, preferably 0.5 to 25, weight percent based on the monomers is used.

Vinyl ethers which can be polymerized in accordance with the process of this invention can be represented by the formula $ROCH=CH_2$ where R represents an alkyl, aryl, alkaryl, aralkyl, alicyclic, or heterocyclic radical. The vinyl ethers generally do not contain more than 15 carbon atoms per molecule. Examples of compounds which can be polymerized include vinyl cyclohexyl ether, vinyl isobutyl ether, vinyl n-butyl ether, vinyl phenyl ether, vinyl propyl ether, vinyl hexyl ether, vinyl octyl ether, vinyl decyl ether, vinyl tridecyl ether, vinyl cyclopentyl ether, vinyl o-cresyl ether, vinyl alpha- and beta-naphthyl ethers, and the like. Divinyl ether can also be polymerized using the catalyst systems herein described. Any monoolefinic or multiolefinic compound, conjugated or unconjugated, generally containing from 4 to 15 carbon atoms per molecule, can be copolymerized with vinyl ethers. Examples of these materials include styrene, isobutylene, 1,5-hexadiene, vinylcyclohexene, 1,3-butadiene, isoprene, piperylene, 2-methyl-1,3-pentadiene, 2,3-dimethyl-1,3-butadiene, 3-methyl-1,4-pentadiene, and the like.

Using our catalyst systems it is also possible to prepare graft polymers by copolymerizing the vinyl ethers with polymers containing olefin unsaturation such as polybutadiene, polyisoprene, butadiene/styrene copolymers and the like. The polymers which can be copolymerized with the vinyl ethers range from liquid polymers having a viscosity of 100 to 5000 Saybolt Furol Seconds at 100° F. through hard rubbery polymers. A suitable method for the preparation of the liquid polymers is disclosed in Crouch 2,631,175. When copolymers are prepared at least 50 percent of the monomers charged to the polymerization reaction should be conjugated dienes. The preferred conjugated dienes are those which contain from four to six carbon atoms per molecule but those containing eight or even twelve carbon atoms per molecule are applicable. Examples of conjugated dienes includes 1,3-butadiene, isoprene, 1,3-pentadiene, 2-methyl-1,3-pentadiene, 2,3-dimethyl-1,3-butadiene, and the like. Monomers copolymerizable with such dienes include styrene, alpha-methylstyrene, alpha-methyl-p-methylstyrene, acrylonitrile, methacrylonitrile, acrylic and methacrylic acid esters, and the like.

The reaction can be carried out by adding the catalyst to the material to be polymerized or to a solution thereof, or by adding the monomer to the catalyst. In one specific embodiment, a reactor is employed which is provided with a stirrer, suitable condensing system such as a water condenser, inlet tube for inert gas such as nitrogen, means for introducing the vinyl ether, and a means for registering temperature. The reactor is purged with purified nitrogen and nitrogen is passed slowly through the system throughout the reaction.

A diluent is frequently employed for convenience of operation. Materials such as benzene, toluene, n-pentane, methylene chloride, chloroform, chlorobenzene, propane, butane, carbon tetrachloride, carbon disulfide, and petroleum ether are applicable. Polymerization can be effected in the absence of a diluent if desired.

In one embodiment, the diluent, if used, and catalyst are charged to the reactor first and the vinyl ether is added at such a rate that the reaction can be readily controlled. Considerable evolution of heat is generally observed as the reaction is exothermic. The mixture is stirred or agitated by any suitable means throughout the reaction. The reaction can be effected at atmospheric or superatmospheric pressure at temperatures in the range between −100° C. and 200° C., preferably in the range between 75 and 160° C. The reaction time will vary in the range between 30 minutes to 20 hours or more in a given system depending upon the temperature.

At the conclusion of the reaction, the catalyst can be inactivated by the addition of a small quantity of an alcohol such as methanol or ethanol, an acid, a base such as an alkali metal hydroxide, or air. The polymer can be conveniently precipitated from the solvent by pouring the solution into an alcohol. The alcohol which is employed is preferably one with which the reaction solvent is miscible. The diluent used for the reaction is sometimes one in which the polymer is not soluble. When operating in this manner, it is convenient to pour the polymer suspension into an alcohol to facilitate removal of the diluent from the product.

EXAMPLE I

A catalyst suspension was prepared by mixing 10 grams (0.053 mol) of titanium tetrachloride and 20 grams (0.175 mol) of triethylaluminum containing 0.5 weight chlorine with benzene (distilled from sodium) to give 100 cc. of suspension. The mol ratio of organometal compound to titanium tetrachloride was 3.3:1.

A reactor provided with a stirrer, water condenser, thermocouple well, inlet for purified nitrogen, and a dropping funnel was purged with nitrogen and 10 cc. of the catalyst suspension, prepared as described above, was charged together with 100 cc. of benzene (distilled from sodium). Forty-one grams of freshly distilled vinyl cyclohexyl ether was introduced through the dropping funnel. Addition of the vinyl ether was started at room temperature (20 to 30° C.) and it was added as rapidly as possible but at a rate such that no refluxing of the benzene occurred. Considerable heat was evolved during this period. After stirring and refluxing for 30 minutes, the reaction mixture became viscous and no further change was observed after refluxing for an additional period of 15½ hours. Nitrogen was kept flowing through the system at a slow rate to maintain an inert atmosphere in the reactor.

At the conclusion of the reaction, 10 cc. of methanol was added to render the catalyst inactive and the mixture was then diluted to 600 cc. with benzene to facilitate filtering while hot to remove inorganic materials. The filtrate was added to 2000 cc. of methanol to precipitate the vinyl cyclohexyl ether polymer. A yellow-green, elastic-like polymer separated. It was removed, cut into small pieces, and comminuted in a Waring Blendor in the presence of methanol. The alcohol was decanted and the solid product was dried in a vacuum oven for 20 hours at 60° C. to give a slightly yellow, crystalline material. An 84 weight percent yield of polymer, based on the vinylcyclohexyl ether charged was obtained. It had a softening point of 121 to 134° C. and molded to give an amber colored disk but was too brittle to press into a film. It had a density of 1.037.

EXAMPLE II

Vinyl isobutyl ether was polymerized using a titanium tetrachloride-triethylaluminum catalyst. A reactor similar to that described in Example I was employed. It was flushed with nitrogen and 250 cc. benzene (distilled from sodium), 0.5 gram (0.0026 mol) titanium tetrachloride, and 1 gram (0.0088 mol) triethylaluminum containing 0.5 weight percent chlorine were charged in the order named. The mol ratio of organometal compound to titanium tetrachloride was 3.4:1. The addition of 110 cc. of freshly distilled vinyl isobutyl ether was started at room temperature and was added as rapidly as possible but at a rate such that no refluxing of the benzene occurred. Considerable heat was evolved during this period and the reaction mixture became dark brown. After addition of the ether, the mixture was refluxed and stirred for 16 hours. Nitrogen was kept flowing through the system at a slow rate to maintain an inert atmosphere in the reactor.

At the conclusion of the refluxing period, 10 cc. of methanol was added and the viscous mixture was added to 2000 cc. of methanol to precipitate the polymer. The liquid was decanted and the polymer was washed with two 200 cc. portions of methanol and dried in a vacuum oven overnight at 80° C. A dark brown, tough, rubbery gum was obtained which weighed 84.6 grams. It had an inherent viscosity of 0.2305 and was too soft to mold. The inherent viscosity was measured in tetralin at 130° C., the solution containing 0.183 gram of polymer per 100 cc. of solvent.

EXAMPLE III

A copolymer of styrene with vinyl isobutyl ether was prepared in an atmosphere of nitrogen using the same reactor and procedure described in the preceding examples. The reactor was flushed with nitrogen. Two hundred fifty cc. benzene (distilled from sodium), 0.5 gram (0.0026 mol) titanium tetrachloride and 1 gram (0.0088 mol) triethylaluminum containing 0.5 weight percent chlorine was charged in the order named. The mol ratio of organometal compound to titanium tetrachloride was 3.4:1. A mixture of 90.7 grams styrene and 100 cc. freshly distilled vinyl isobutyl ether was introduced through the dropping funnel. A small amount of heat was evolved during addition of the monomer mixture. The mixture was then maintained at a temperature which refluxing occurred and was stirred 16 hours while nitrogen was kept flowing through the system at a slow rate.

The catalyst was inactivated by addition of 10 cc. methanol and the mixture was filtered hot. The polymer was precipitated by pouring the solution (filtrate) into 2000 cc. methanol. The precipitate was a yellow tar-like material. It was separated from the liquid and was washed with two 200 cc. portions of methanol and dried overnight in a vacuum oven at 80° C. One hundred grams of a tough, rubbery gum was obtained which did not appear sticky but showed adhesive characteristics when pressed against different surfaces. It was a light tan polymer which was too soft to mold. The inherent viscosity, determined as in Example II, was 0.2535.

EXAMPLE IV

A reactor provided with a stirrer, water condenser, dropping funnel, and inlet for purified nitrogen was purged with nitrogen and charged with 200 cc. of benzene (distilled from sodium), 0.57 cc. (1.0 gram, 0.0055 mol) of titanium tetrachloride, and 2.4 cc. (2 grams, 0.018 mol) of triethylaluminum added in the order named. The mol ratio of organometal compound to titanium tetrachloride was 3.4:1. Vinyl n-butyl ether (100 cc.) which had been distilled from sodium was introduced slowly, with stirring so that benzene refluxed but did not flood the condenser. After addition of the ether, the mixture was refluxed and stirred for 8 hours. Throughout the reaction period, nitrogen was kept flowing through the system at a slow rate.

At the conclusion of the refluxing period, 10 cc. of methanol was added and the viscous reaction mixture was poured, with stirring, into 2000 cc. of methanol. The polymer was a viscous, pale yellow oil. The methanol was decanted and 2000 cc. more methanol was used to wash the polymer. The product was dried in a vacuum oven overnight at 65° C. It had a molecular weight of 8000 ±1000 as determined by boiling point elevation using benzene as the solvent and had an inherent viscosity of 0.2060 determined as in Example II.

EXAMPLE V

The reactor employed in Example IV was flushed with nitrogen and charged with 200 cc. of benzene (distilled from sodium) and 2 cc. (2.25 grams, 0.0182 mol) of ethylaluminum sesquichloride (mixture of diethylaluminum chloride and ethylaluminum dichloride containing 47.4 weight percent chlorine) after which 100 cc. of vinyl n-butyl ether (distilled from sodium) was introduced slowly. The reaction mixture was dark green but changed to an orange-brown after refluxing for 3 hours. Refluxing was continued for a total time of 12 hours, and the mixture was stirred. Nitrogen was passed through the system at a slow rate throughout the reaction period.

At the conclusion of the reaction period, 10 cc. of methanol was added to the refluxing mixture which was filtered while hot, and the filtrate was poured into 2000 cc. of methanol. A dark brown viscous oil was obtained which was washed with methanol after decanting the methanol layer. The polymer was dried in a vacuum oven at 65° C. to give 19 grams of product having an inherent viscosity of 0.2395 determined as in Example II.

EXAMPLE VI

A reactor similar to that employed in Example IV was flushed with nitrogen and charged with 200 cc. of benzene (distilled from sodium), 2 cc. (2.25 grams, 0.0182 mol) of ethylaluminum sesquichloride (containing 47.4 weight percent chlorine), and 100 cc. of vinyl 2-chloroethyl ether (distilled from sodium). A purple color developed, which changed to brown after all the ether had been added. Following addition of the ether, the mixture was refluxed and stirred for 12 hours while a stream of nitrogen was passed through the system at a slow rate. At the end of this period, 10 cc. of the methanol was added, the hot mixture was filtered, and the filtrate was poured into 2000 cc. of methanol. A dark brown, viscous oil separated. It was washed with methanol and dried 24 hours in a vacuum oven at 65° C. The product weighed 53 grams and had an inherent viscosity of 0.0795 determined as in Example II.

EXAMPLE VII

A reactor similar to that described in Example IV was flushed with nitrogen and charged with 200 cc. of benzene (distilled from sodium), 0.57 cc. (1.0 gram, 0.0053 mol) of titanium tetrachloride, and 3 cc. (3.38 grams, 0.027 mol) of ethylaluminum sesquichloride as used in Example V. The mol ratio of organometal compound to ethylaluminum sesquichloride was 5.1:1. Vinyl n-butyl ether (100 cc.) which has been distilled from sodium was introduced slowly with stirring and after the addition of the ether, the mixture was refluxed and stirred 16 hours while a stream of nitrogen was passed through the system, after which 10 cc. of methanol was added. The mixture was filtered while hot and the filtrate was poured into 2000 cc. of methanol. The dark brown, viscous oil which separated was washed with methanol and dried in a vacuum oven at 65° C. for 24 hours. The product weighed 35 grams and had an inherent viscosity of 0.3340 determined as in Example II.

EXAMPLE VIII

Vinyl 2-ethylhexyl ether was polymerized using the reactor described in Example IV. The reactor was flushed with nitrogen and charged with 200 cc. of benzene (distilled from sodium), 0.57 cc. (1.0 gram, 0.0053 mol) of titanium tetrachloride, 2 cc. (0.0146 mol) of triethylaluminum, and 100 cc. of vinyl 2-ethylhexyl ether (distilled from sodium). The mol ratio of organometal compound to titanium tetrachloride was 2.75:1. As in the preceding runs, the ether was introduced slowly in order to control the reaction. A stream of nitrogen was passed through the system and the mixture was stirred and refluxed for 17 hours after addition of the ether. Methanol (10 cc.) was added and the viscous mixture was poured into 2000 cc. of methanol. The viscous oil was separated, washed with methanol, and dried overnight in a vacuum oven at 65° C. Seventy-five grams of a dark brown oil was obtained which had an inherent viscosity of 0.313 determined as in Example II except that the concentration of the solution was 0.092 gram of polymer per 100 cc. of solvent.

EXAMPLE IX

A 10-ounce bottle, flushed with pre-purified nitrogen, was charged with 50 cc. of cyclohexane, 0.6 gram (0.048 mol) of ethylaluminum sesquichloride, 0.17 gram (0.0009 mol) of titanium tetrachloride, and 7.7 grams of vinyl isobutyl ether, the monomer being added rapidly (within 10 seconds) from a pipette. The mol ratio of organometal compound to titanium tetrachloride was 3:1. The amount of catalyst employed, based on the monomer, was 10 weight percent. The reaction was instantaneous upon addition of the monomer. Sufficient methanol was added to the reaction mixture to inactivate the catalyst and precipitate the polymer which was separated by filtration and dried in a vacuum oven for 18 hours. The product was a tough, sticky gum having a slightly yellow color.

This polymer was dissolved in benzene to provide a one percent solution. Pieces of cotton duck, previously laundered to remove oils, etc. were treated with this solution by dipping, wringing, and drying.

The test procedures described in Technical Manual and Yearbook of the American Association of Textile Chemists and Colorists, volume 29, Howes Publishing Company, pages 146–147 (Test A) and 152–153 (Test B) were used to test water repellency of the treated fabric. Controls were run in each case using untreated duck. Data of these tests are tabulated below.

*Water Repellency of Cotton Duck (Test A)*

| Treatment: | Rating |
| --- | --- |
| None (control) | 0 |
| One coating | 70 |
| Two coatings | 80 |
| Three coatings | 80+ |

*Water Repellency of Cotton Duck (Test B)*

| Treatment: | Pickup in blotter, gms. |
| --- | --- |
| None | 22.2 |
| One coating | 5.7 |
| Two coatings | 5.6 |
| Three coatings | 2.7 |

These results show that products of our invention are highly useful in providing water repellent coatings on fabrics.

EXAMPLE X

A 1-liter reactor (3 necked flask) was purged with pre-purified nitrogen and charged with 150 cc. of cyclohexane, 6 grams (0.048 mol) of ethylaluminum sesquichloride, and 0.76 cc. (1.292 grams, 0.0068 mol) of titanium tetrachloride. The mol ratio of organometal compound to titanium tetrachloride was 7.1:1. Methyl vinyl ether introduced below the surface of the liquid in the reactor over a period of 2.5 hours. The addition was started at room temperature with no temperature control being used. Temperature ranged from about 25 to 40° C. Methanol was added to inactivate the catalyst and precipitate the polymer which was then separated and dried in a vacuum oven at 50° C. for 18 hours. Fifteen grams of a dark brown rubbery polymer, which was insoluble in cold water was obtained.

EXAMPLE XI

A reactor was cooled to −60° C. while being flushed. Between 200 and 300 cc. of propane was condensed in the reactor and it was charged with 49.6 cc. of a cyclohexane solution containing 0.24 g./cc. of ethylaluminum sesquichloride (11.9 grams, 0.096 mol of sesquichloride) and 15.2 cc. of a cyclohexane solution containing 0.19 g./cc. of titanium tetrachloride (2.89 grams, 0.015 mol). The mol ratio of organometal compound to titanium tetrachloride was 6.4:1. Methyl vinyl ether was liquefied and 50 cc. (37.5 grams) of it was charged rapidly to the reactor. The amount of catalyst employed, based on the monomer, was 39.4 weight percent. The reaction took place instantaneously at −60° C. and a solid polymer precipitated. Methanol was added to the reaction mixture, the mixture allowed to warm to room temperature, and the polymer was separated by filtration and dried in a vacuum oven for 18 hours at 50° C. The dried polymer weighed 30 grams.

EXAMPLE XII

Vinyl ethyl ether was polymerized at −60° C. in an open reactor which was continuously flushed with pre-purified nitrogen. After cooling to this temperature, there was charged to the reactor 200 cc. of liquid propane, 12.4 cc. of a cyclohexane solution of ethylaluminum sesquichloride containing 0.24 gram/cc. (2.98 grams, 0.024 mol) and 3.8 cc. of a cyclohexane solution of titanium tetrachloride containing 0.1 gram/cc. (0.38 gram, 0.002 mol). The mol ratio of organometal compound to titanium tetrachloride was 12:1. Twenty cc. (15.26 grams) of vinyl ethyl ether was added. The reaction took place instantaneously at −60° C. Methanol was added, the mixture was allowed to warm to room temperature and, after drying, 15 grams of a dark colored, tacky rubbery polymer was obtained. In this run, the amount of catalyst, based on the vinyl ether to be polymerized, was 22 weight percent.

EXAMPLE XIII

A 10-ounce bottle, flushed with pre-purified nitrogen, was charged with 5.2 cc. of a cyclohexane solution of triethylaluminum containing 0.13 gram/cc. (0.68 gram, 0.006 mol) and 1.9 cc. of a cyclohexane solution of titanium tetrachloride containing 0.1 gram/cc. (0.19 gram, 0.001 mol). The mol ratio of organometal compound to titanium tetrachloride was 6:1. One cc. (0.91 gram) of vinyl cyclohexyl ether was added to the catalyst followed by 10 cc. (9.6 grams) of methyl acrylate. The amount of catalyst, based on the total polymerizable material was 8.3 weight percent. The bottle was capped, placed in a bath at 50° C., and rotated for 48 hours. Methanol was added to the reaction mixture and the polymer which precipitated was separated by filtration and dried in a vacuum oven for 18 hours at 50° C. A tacky product was obtained in a 5.5 gram yield.

EXAMPLE XIV

A run similar to that described in Example XIII was made using vinyl isobutyl ether and methyl acrylate. A brown, crumbly polymer was obtained.

EXAMPLE XV

Another run similar to that described in Example XIII was made using vinyl ethyl ether and methyl acrylate. A tacky, rubbery product resulted.

EXAMPLE XVI

A 10-ounce bottle, flushed with pre-purified nitrogen, was charged with a triethylaluminum-titanium tetrachloride catalyst as in Example XIII. Ten cc. (9.1 grams) of vinyl cyclohexyl ether and 10 cc. (9.2 grams) of 2-methyl-5-vinylpyridine were added. The bottle was capped, placed in a bath at 50° C., and rotated 23 hours. A viscous reaction mixture was obtained. It was poured into water and stirred in a Waring Blendor. A spongy mass of polymer remained after pouring off the water. After drying in a vacuum oven 18 hours at 50° C., a hard, resinous product which weighed 5 grams was obtained. The amount of catalyst employed, based on the total polymerizable material, was 4.75 weight percent.

EXAMPLE XVII

Polymerization of vinyl cyclohexyl ether was effected at room temperature in a nitrogen atmosphere in a 10-ounce bottle in the presence of 1.2 gram (0.006 mol) of tributylaluminum and 0.04 gram (0.003 mol) of chromyl chloride ($CrO_2Cl_2$). The mol ratio of organometal compound to chromyl chloride was 20:1. An instantaneous reaction took place upon addition of 10 cc. (9.1 grams) of the ether. Methanol was added and the polymer was separated by filtration and dried as in preceding examples. Nine grams of a solid polymer was obtained. The product was tough and had a purple color. The amount of catalyst employed, based on the vinyl ether, was 13.6 weight percent.

EXAMPLE XVIII

Fifty cc. of cyclohexane was charged to a 10-ounce bottle which had been flushed with pre-purified nitrogen and 0.6 gram (0.0049 mol) of ethylaluminum sesquichloride and 0.02 gram (0.00013 mol) of chromyl chloride were added. The mol ratio of organometal compound to chromyl chloride was 37.7:1. An instantaneous reaction took place upon addition of 10 cc. (9.1) grams of vinyl cyclohexyl ether. The product was recovered and dried in the manner described in Example XVII. Nine grams of a light, foamy solid having a tan color was obtained. The amount of catalyst employed, based on the vinyl cyclohexyl ether, was 6.8 percent by weight.

EXAMPLE XIX

The procedure described in Example XVIII was followed for the polymerization of vinyl cyclohexyl ether except for the catalyst system which consisted of 0.6 gram (0.0049 mol) of ethylaluminum sesquichloride and 0.2 gram (0.0006 mol) of tetrabutyl titanate. The mol ratio of ethylaluminum sesquichloride to tetrabutyl titanate was 8.2:1. The amount of catalyst employed, based on the vinyl cyclohexyl ether, was 8.8 weight percent. Five grams of a white, foamy, solid polymer was obtained.

EXAMPLE XX

A 10-ounce bottle which had been flushed with pre-purified nitrogen was charged with 200 cc. of liquid propane, 0.6 gram (0.003 mol) of tributylaluminum, and 0.02 (0.00013 mol) of chromyl chloride. The mol ratio of tributylaluminum to chromyl chloride was 23:1. The reaction began immediately upon the addition of 10 cc. (9.1 grams) of vinyl cyclohexyl ether. Temperature of the reaction was −60° C. After 30 minutes, the product was recovered in the manner described in Example XVII. A green, brittle solid which weighed 5 grams was obtained. The amount of catalyst used in this run, based on the vinyl cyclohexyl ether, was 6.8 weight percent.

EXAMPLE XXI

In this and the following examples, graft polymers were prepared using a liquid butadiene polymer prepared in the presence of finely divided sodium according to the method disclosed in Crouch 2,631,175.

An open reactor was continuously flushed with pre-purified nitrogen and charged with 52 cc. of a cyclohexane solution of triethylaluminum containing 0.13 gram per cc. (7.15 grams, 0.063 mol) and 19 cc. of a cyclohexane solution of titanium tetrachloride containing 0.1 gram per cc. (1.9 grams, 0.010 mol.) The mol ratio of triethylaluminum to titanium tetrachloride used was 3.8:1. Liquid polybutadiene (300 grams) and 50 grams of vinyl stearyl ether were added simultaneously to the catalyst composition. The amount of catalyst, based on the polymerizable material, was 2.6 weight percent. Flushing of the reactor with nitrogen was continued for two hours while the reactants were maintained at room temperature (approximately 80 to 100° F.). Methanol was added to deactivate the catalyst. It was then poured off and the polymer was dried in a vacuum oven for 18 hours at 50° C. The product was a tacky solid.

The liquid polybutadiene employed in the production of the hereinbefore described graft polymers was prepared by mass polymerization in the presence of finely divided sodium. This polymer had the following properties:

| | |
|---|---|
| Specific gravity, 60° F. | 0.9083 |
| Refractive index, $n20/D$ | 1.5198 |
| Ash, wt. percent | 0.05 |
| Gardner color | 11 |
| Volatile material, wt. percent | 1.0 |
| Viscosity, SFS at 100° F. | 1500 |

EXAMPLE XXII

An open reactor was continuously flushed with pre-purified nitrogen and charged with 300 grams of liquid polybutadiene, 7.15 grams (0.063 mol) of triethylaluminum, and 1.9 grams (0.010 mol) of titanium tetrachloride. The catalyst components were charged in solution in cyclohexane as in the preceding example. Thirty grams of vinyl stearyl ether was introduced and the reactants were kept at room temperature (about 80 to 100° F.) for two hours while flushing of the reactor with nitrogen was continued. The amount of catalyst, based on the polymerizable material, was 2.74 weight percent. Methanol was added and the polymer was recovered and dried as before. A tacky, solid product was obtained.

EXAMPLE XXIII

Three hundred grams of liquid polybutadiene described in Example XXI and 75 grams of vinyl 2-ethylhexyl ether were mixed and charged to an open reactor which was continuously flushed with pre-purified nitrogen. A solution of 90 cc. of triethylaluminum in cyclohexane containing 0.13 gram/cc. (11.7 grams, 0.103 mol) and 33 cc. of titanium tetrachloride in cyclohexane containing 0.1 gram/cc. (3.3 grams, 0.017 mol) were charged. The catalyst components were mixed and added in increments as rapidly as possible without causing an appreciable increase in temperature. The mixture was stirred for one to two hours after addition of the catalyst. Methanol was added to inactivate the catalyst after which it was decanted and the polymer was dried as in preceding examples. A tacky, syrupy product resulted. The mol ratio of triethylaluminum to titanium tetrachloride used in this run was 6:1 and the amount of catalyst employed, based on the polymerizable material, was 15 weight percent.

EXAMPLE XXIV

A graft polymer was prepared from the liquid polybutadiene described in Example XXI and vinyl isobutyl ether. An open reactor was flushed continuously with pre-purified nitrogen and charged with 0.68 gram (0.006 mol) of triethylaluminum (5.2 cc. of a cyclohexane solution containing 0.13 gram per cc.) and 0.19 gram (0.001 mol) of titanium tetrachloride (1.9 cc. of a cyclohexane solution containing 0.19 gram per cc.). Liquid polybutadiene (10 cc., 9.1 grams) and 10 cc. (7.7 grams) of vinyl isobutyl ether were charged simultaneously to the catalyst composition. The reaction took place instantaneously. Methanol was added and the polymer was recovered and dried as in the foregoing examples. The product was a tacky yellow solid. The mol ratio of triethylaluminum to titanium tetrachloride was 6:1. The amount of catalyst employed, based on polymerizable material, was 4.8 weight percent.

As many possible embodiments can be made of this invention without departing from the scope thereof, it is to be understood that all matter herein set forth is to be interpreted as illustrative and not as unduly limiting the invention.

We claim:

1. A method which comprises copolymerizing materials consisting essentially of a polymer having a viscosity of at least 100 Saybolt Furol seconds at 100° F. of a conjugated diene containing 4 to 6 carbon atoms with monovinyl ethers containing 3 to 15 carbon atoms per molecule to form a copolymer in the presence of a catalyst comprising at least one member selected from the group consisting of (1) at least one compound selected from the group consisting of organometal compounds and metal hydrides: (2) a mixture of (a) at least one compound selected from the group consisting of organometal compounds and metal hydrides, and (b) a metal compound selected from the group consisting of group IV, group V, and group VI metal oxides, hydrides, halides, oxyhalides, and salts of organic acids, and group IV alcoholates; and (3) a mixture of (a) at least one compound selected from the group consisting of group IV metal halides and (b) at least one metal selected from the group consisting of metals of group I, group II, and group III.

2. The method of claim 1 wherein the catalyst is titanium tetrachloride and triethylaluminum.

3. The method of claim 1 wherein the catalyst is titanium tetrachloride and ethylaluminum sesquichloride.

4. The method of claim 1 wherein the catalyst is ethylaluminum sesquichloride.

5. The method of claim 1 wherein the catalyst is chromyl chloride and isobutylaluminum.

6. The method of claim 1 wherein the catalyst is chromyl chloride and ethylaluminum sesquichloride.

7. The method of claim 1 wherein the catalyst is tetrabutyl titanate and ethylaluminum sesquichloride.

8. The method of claim 1 wherein the ether is selected from the group consisting of vinyl cyclohexyl ether, vinyl isobutyl ether, vinyl n-butyl ether, vinyl 2-chloroethyl ether, vinyl 2-ethylhexyl ether, methyl vinyl ether, vinyl ethyl ether and vinyl stearyl ether.

9. A method which comprises copolymerizing materials consisting essentially of liquid polybutadiene having a viscosity of 100 to 5000 Saybolt Furol seconds at 100° F. with monovinyl ethers containing 3 to 15 carbon atoms per molecule to form a copoylmer in the presence of a catalyst comprising at least one member selected from the group consisting of (1) at least one compound selected from the group consisting of organometal compounds and metal hydrides; (2) a mixture of (a) at least one compound selected from the group consisting of organometal compounds and metal hydrides, and (b) a metal compound selected from the group consisting of group IV, group V, and group VI metal oxides, hydrides, halides, oxyhalides, and salts of organic acids, and group IV alcoholates; and (3) a mixture of (a) at least one compound selected from the group consisting of group IV metal halides and (b) at least one metal selected from the group consisting of metals of group I, group II, and group III.

10. The method of claim 9 wherein said ether is vinyl stearyl ether and said catalyst is a mixture of triethylaluminum and titanium tetrachloride.

11. A method which comprises copolymerizing materials essentially of liquid polybutadiene having a viscosity of 100 to 5000 Saybolt Furol seconds at 100° F. with vinyl 2-ethylhexyl ether to form a copolymer in the presence of a catalyst comprising at least one member selected from the group consisting of (1) at least one compound selected from the group consisting of organometal compounds and metal hydrides; (2) a mixture of (a) at least one compound selected from the group consisting of organometal compounds and metal hydrides, and (b) a metal compound selected from the group consisting of group IV, group V, and group VI metal oxides, hydrides, halides, oxyhalides, and salts of organic acids, and group IV alcoholates; and (3) a mixture of (a) at least one compound selected from the group consisting of group IV metal halides and (b) at least one metal selected from the group consisting of metals of group I, group II, and group III.

12. A method which comprises copolymerizing materials consisting essentially of liquid polybutadiene having a viscosity of 100 to 5000 Saybolt Furol seconds at 100° F. with vinyl isobutyl ether to form a copolymer in the presence of a catalyst comprising at least one member selected from the group consisting of (1) at least one compound selected from the group consisting of organometal compounds and metal hydrides; (2) a mixture of (a) at least one compound selected from the group consisting of organometal compounds and metal hydrides, and (b) a metal compound selected from the group consisting of group IV, group V, and group VI metal oxides, hydrides, halides, oxyhalides, and salts of organic acids, and group IV alcoholates; and (3) a mixture of (a) at least one compound selected from the group consisting of group IV metal halides and (b) at least one compound selected from the group consisting of metals of group I, group II, and group III.

References Cited in the file of this patent

UNITED STATES PATENTS

| | | |
|---|---|---|
| 2,471,959 | Hunt | May 31, 1949 |
| 2,475,520 | Roedel | July 5, 1949 |
| 2,688,009 | Crouch et al. | Aug. 31, 1954 |
| 2,721,189 | Anderson et al. | Oct. 18, 1955 |
| 2,824,089 | Peters et al. | Feb. 18, 1958 |
| 2,825,719 | Herrle et al. | Mar. 4, 1958 |
| 2,846,427 | Findlay | Aug. 5, 1958 |
| 2,881,156 | Pilar et al. | Apr. 7, 1959 |
| 2,894,921 | Jones | July 14, 1959 |

FOREIGN PATENTS

| | | |
|---|---|---|
| 533,362 | Belgium | May 16, 1955 |
| 534,792 | Belgium | Jan. 31, 1955 |
| 534,888 | Belgium | Jan. 14, 1955 |